May 20, 1924.

T. PARKER ET AL

SAFETY HEADLIGHT

Filed Nov. 25, 1922

1,494,500

Inventor:
Thaddeus Parker.
James C. Lawrence.
Fred G. Dunn.
By A. J. O'Brien
Attorney Patented May 20, 1924.

1,494,500

UNITED STATES PATENT OFFICE.

THADDEUS PARKER, JAMES CENTENIAL LAWRENCE, AND FRED G. DUNN, OF PRIMERO, COLORADO.

SAFETY HEADLIGHT.

Application filed November 25, 1922. Serial No. 603,322.

*To all whom it may concern:*

Be it known that THADDEUS PARKER, JAMES C. LAWRENCE, and FRED G. DUNN, citizens of the United States, residing at Primero, in the county of Las Animas and State of Colorado, have invented certain new and useful Improvements in Safety Headlights; and they do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automobile headlights, and has special reference to means whereby the lights may be readily so adjusted that they will not interfere with the vision of an approaching driver.

It is a notorious fact that a large number of fatal accidents occur annually, due to the fact that the driver becomes blinded by the glare of an approaching headlight which momentarily makes it impossible for him to see the road.

It is the object of our present invention to provide a headlight and mounting therefor which will make it possible for the driver to change the angle of the lamp, with respect to the horizon, whenever he meets another automobile.

Our invention consists, briefly, in so mounting the lamps that they can be tilted about a horizontal pivot whose axis is transverse to the axis of the automobile. This enables the driver to tilt the lamp downwardly when meeting another machine, so as to direct the rays down upon the road and thereby prevent glaring rays of light from striking the eyes of the approaching driver.

We will now describe the preferred embodiment of our invention, and for this purpose we shall make reference to the accompanying drawing, in which—

The same reference numbers will be used to designate the same parts throughout the several views.

Figure 1:
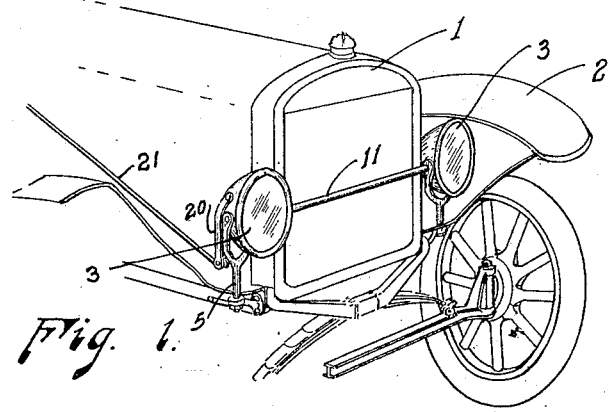
Fig. 1 shows a perspective view of a car equipped with our safety headlights.
Figure 2:
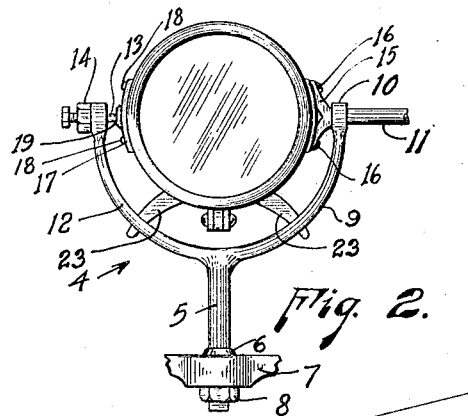
Fig. 2 is a front elevation of one of the lights and shows the manner in which it is mounted so as to be readily tiltable.
Figure 3:
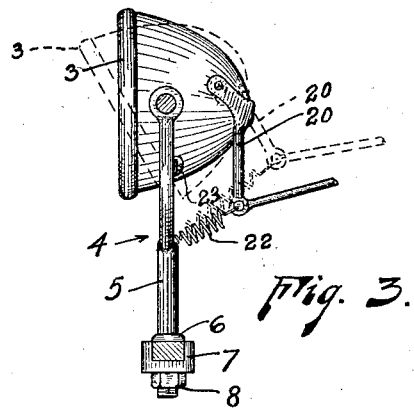
Fig. 3 is a side elevation of the lamp shown in Fig. 2 and shows in dotted lines the position to which the lamp is tilted upon meeting an approaching vehicle.
Figure 4:
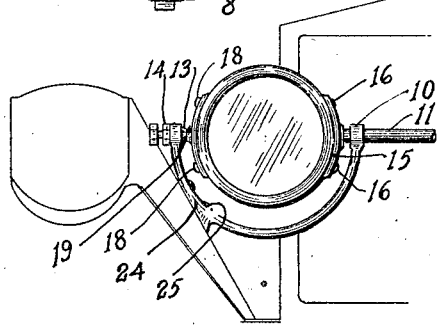
Fig. 4 shows how the mounting may be modified so as to make it adaptable to other makes of cars.

Numeral 1 designates the front end of an automobile provided with the usual fenders 2 and with our improved safety headlights 3, which are pivotally mounted in the manner clearly shown in Figs. 2 and 3. The brackets 4 in which the lamps 3 are mounted are formed with a stem portion 5 which has a shoulder 6 which engages the support 7 to which it is clamped by nut 8. The upper part of the brackets 4 is branched and curved into semicircular form. One of the branches, which is designated by numeral 9, has a bearing 10 in which is journaled shaft 11, and the other branch 12 is threaded for the reception of a bolt 13 which is locked in place by nut 14. The shaft 11 is provided with forked ends 15 (at least one of which is removable), the ends of which are fastened to the lamp 3 by means of rivets or bolts 16. The opposite side of the lamp has a curved bar 17 which is secured to the lamp housing by means of rivets 18. Bar 17 is provided intermediate its ends with a socket 19 for the reception of the point of bolt 13. The shaft 11 extends across the front of the car and is similarly connected with the other lamp which is mounted on the bracket in the manner described above. Secured to the rear of one of the lamps is a bracket 20 to the lower end of which is pivotally secured a rod 21 which extends rearwardly to within easy reach of the driver. It is evident that by moving the rod 20 forward and back the lamps 3 can be tilted to any desired angle. In Fig. 3 we have shown the normal position of the lamp by means of full lines and by dotted lines the position to which the lamps are tilted upon meeting another vehicle. We have shown a spring 22 which extends from the support 4 to the end of bracket 20. This spring is tensioned and holds the lamp normally in the position shown in Fig. 3. A stop 23 may be secured to the rear of the lamps 3 and provided with extensions which engage the arms 9 and 12 (Fig. 2) and serve as stops. If rod 21 be a rigid member it may not be necessary to have spring 22 and stop 23, as the lamps can be held in place by the rod, but wherever a spring 22 and stop 23 are provided, a flexible member, such as a wire or cord, may take the place of rod 21, as it will only be subjected to tension. We have shown bracket 20 attached to the right hand lamp, as it could be better shown in that position, but the logical position would be on the left hand lamp or to any part of shaft 11. Where our improved lamps are to be attached to the fenders of the car, in the manner shown in Fig. 4, the supporting brackets have the stem 5 omitted and are made in the shape of a semicircle with a flattened portion 24, which is secured in place by bolts or rivets 25 (Fig. 4).

Having now described our invention, what we claim is:

In an automobile, a substantially semicircular support on each side thereof, a bearing in the upper end of adjacent sides of said supports, a shaft journaled in said bearings; a forked securing member on each end of the shaft, a lamp secured to each of said forked members; a bolt threadedly connected to the other end of said supports, said bolt having a tapering end; a member secured to said lamp, said member having a cavity for the reception of the tapering end of the bolt so as to form a pivot; a stop secured to each lamp, said stop being adapted to engage the support; a spring operatively secured to said support and lamp and means for rotating said shaft and lamps.

In testimony whereof they affix their signatures.

THADDEUS PARKER.
JAMES CENTENIAL LAWRENCE.
FRED G. DUNN.